United States Patent

[11] 3,612,567

| [72] | Inventor | Walter S. Eggert, Jr. |
| | | Huntingdon Valley, Pa. |
| [21] | Appl. No. | 854,696 |
| [22] | Filed | Sept. 2, 1969 |
| [45] | Patented | Oct. 12, 1971 |
| [73] | Assignee | Booth Airside Services, Inc. |

[54] REAR AXLE ASSEMBLY
2 Claims, 6 Drawing Figs.

[52] U.S. Cl. ............................................. 280/80 R,
180/36, 180/88, 280/5, 296/15
[51] Int. Cl. ............................................. B60g 1/02
[50] Field of Search ............................................. 280/80,
106, 106.5, 5; 180/88, 36, 37; 296/15; 244/100

[56] References Cited
UNITED STATES PATENTS
1,116,785  8/1907  Bartholomew .................. 180/36
FOREIGN PATENTS
558,425  6/1957  Belgium ........................ 296/28 (.1)
1,331  1861  Great Britain ................ 180/36
245,562  11/1946  Switzerland .................. 280/80

*Primary Examiner*—Leo Friaglia
*Assistant Examiner*—John P. Silverstrim
*Attorney*—Stowell and Stowell

ABSTRACT: An unsprung rear axle assembly for a vehicle having a chassis which includes a main horizontal support beam and a vertical post upon which a passenger pod is adapted to be moved up and down. The axle assembly is in the form of a truss which includes vertical diagonal struts connected from the ends of the axle to the vertical post to resist lateral overturning moments which may be applied through the vertical post. The assembly further includes horizontal diagonal struts connected from the ends of the axle to the horizontal beam to resist braking moments and longitudinal forces when the vehicle is slowed down or stopped. Shear blocks are affixed to the chassis to permit accurate alignment of the ends of the vertical and horizontal struts thereby aiding in the assembly, disassembly and reassembly of the axle assembly from the chassis while still maintaining accurate alignment of the parts involved.

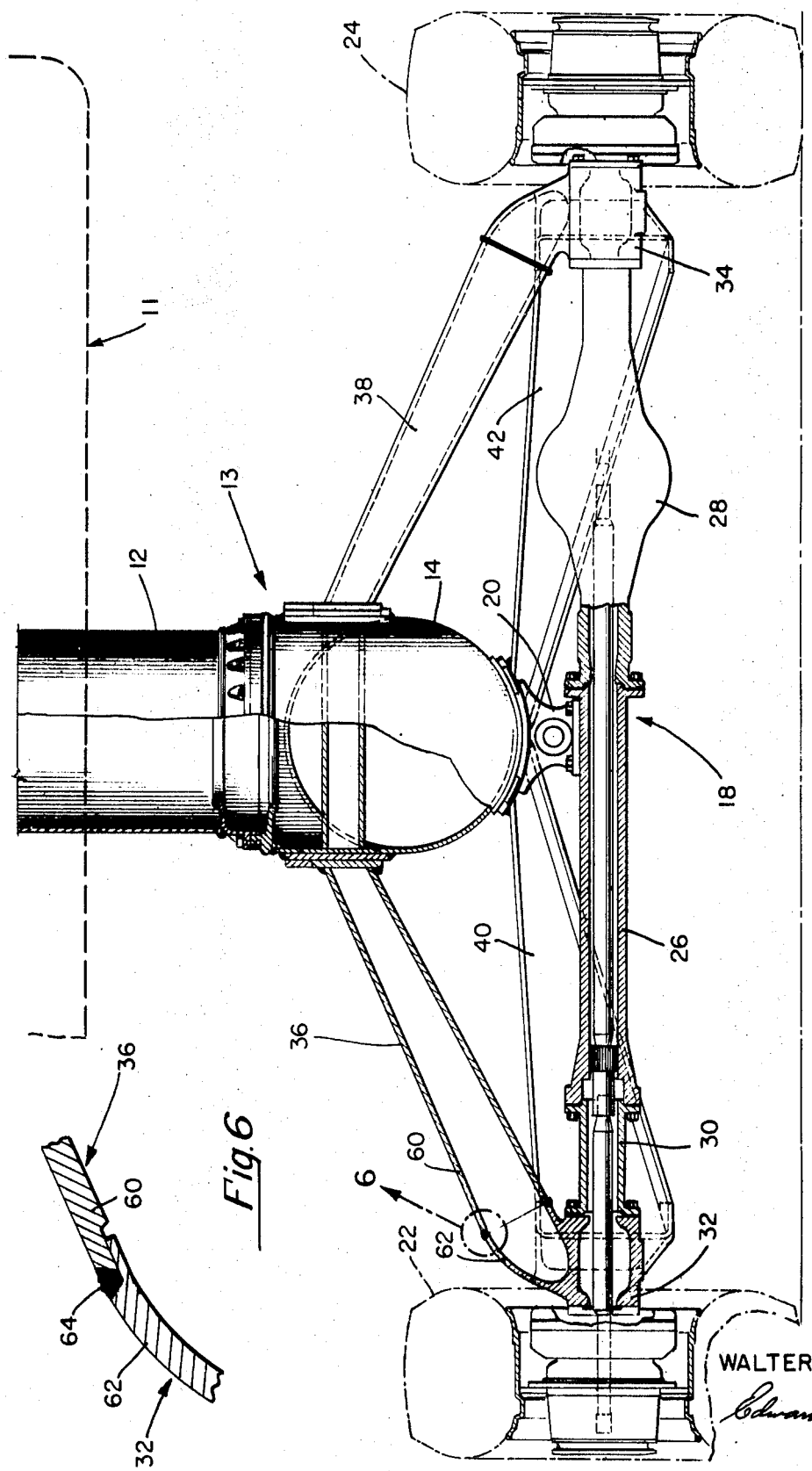

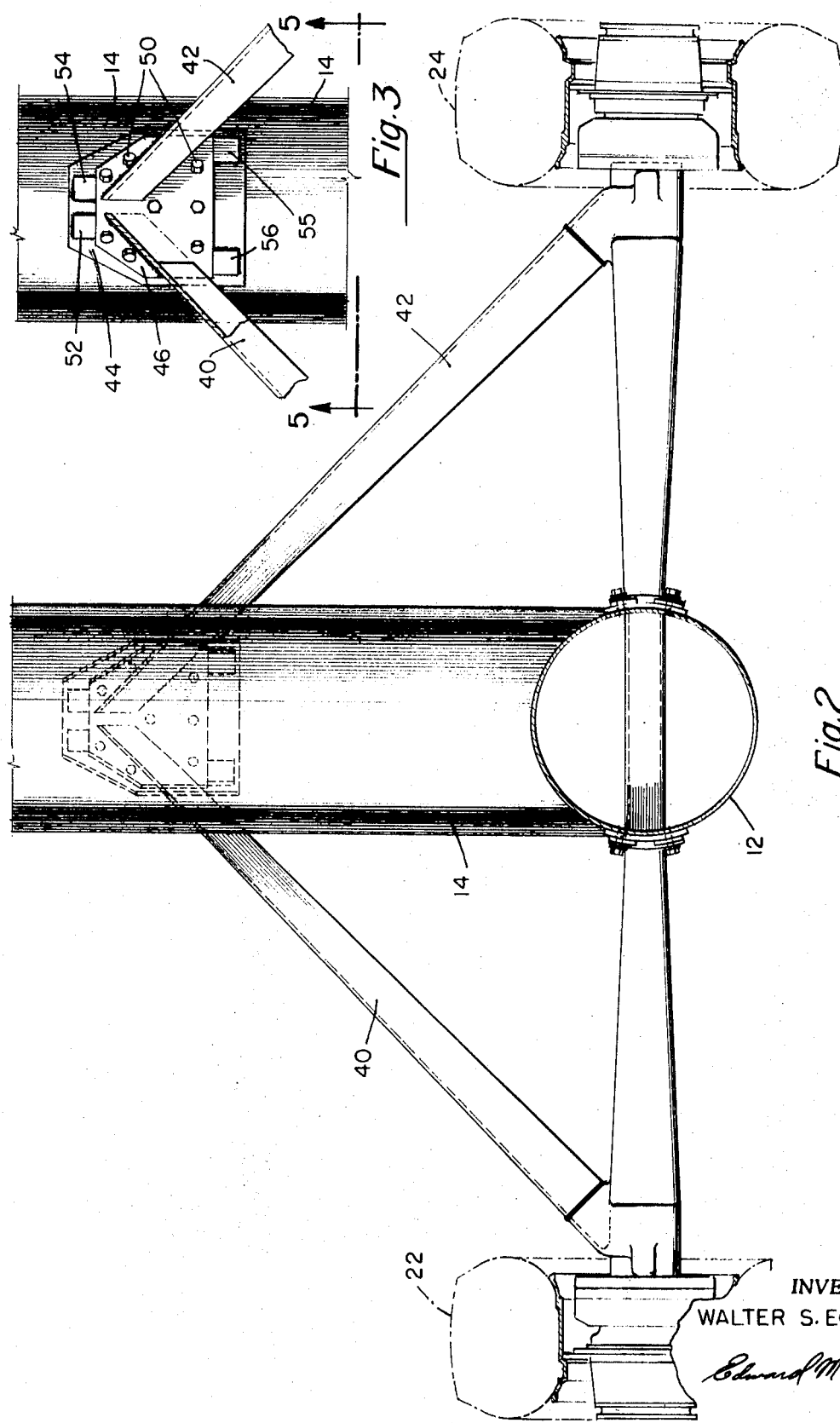

INVENTOR.
WALTER S. EGGERT, JR.
BY Edward M. Farrell
ATTORNEY

REAR AXLE ASSEMBLY

This invention has particular utility in an aircraft transfer vehicle of the type illustrated and described in application of James M. Herring, Ser. No. 762,443, filed Sept. 25, 1968, entitled "Aircraft Transfer Vehicle," (now U.S. Pat. No. 3,537,745), which is assigned to the same assignee as the present invention. In this application, a vehicle for transporting passengers between a terminal building and a parked aircraft is illustrated having a chassis with a passenger pod mounted for up and down lifting movement on a vertical post. A rigid unsprung rear axle assembly for driving the vehicle across the ground is supported beneath the chassis.

In building a vehicle of the type described in the aforementioned patent application, a number of problems are present. From a manufacturer's point of view, one problem relates to the relatively large size of the vehicle, which may be over 15 feet wide, and the requirement relating to the shipment of the vehicle to remote points. In order to ship the vehicle by conventional means, it is necessary to disassemble the various parts of the vehicle prior to shipment. When the vehicle is reassembled, it is important that the main parts be reassembled easily and in correct alignment.

Another problem related to vehicles of the type described relates to the lateral forces which may be exerted against the pod of the vehicle, especially when it is in a raised position. These lateral forces may result from high wind velocity, for example. Also, forces may be exerted as a result of more passengers in the pod being on one side than on the other.

Another problem related to the vehicle of the type described involves forces resulting from turning or braking actions of the vehicle. Braking forces, for example, tend to cause a situation wherein the pod exerts a forward pressure when the brakes are applied. These forces also create longitudinal stresses within the main support members.

It is an object of this invention to provide a vehicle for transporting passengers wherein improved means are provided to permit accurate assembly and disassembly of the main parts of the vehicle to facilitate repair and shipment.

It is a further object of this invention to provide a vehicle having a vertically movable pod for transporting passengers, in which improved support means are provided to handle lateral forces, such as wind, exerted on the pod when it is in a raised position.

It is still a further object of this invention to provide an improved support means to handle forces resulting from braking and turning actions applied to the vehicle.

In accordance with the present invention a vehicle includes a chassis having a vertical post and a main horizontal support beam. A passenger pod is adapted to be moved up and down on the vertical post. A rear axle member extends below the horizontal support beam transverse thereto. A first pair of horizontal strut members are connected from points adjacent the ends of the rear axle member to forward points on the bottom of the horizontal support beam of the chassis. A second pair of strut members are connected from points adjacent the rear axle member extending angularly upwardly to points on the sides of the chassis. The two pairs of strut members are detachably mounted to the chassis to permit disassembly for shipment. Alignment means are provided on the chassis so that reassembly at the destination of the shipment may be made accurately.

Other objects and advantages of the present invention will be apparent and suggest themselves to those skilled in the art, from a reading of the following specification and claims, in conjunction with the accompanying drawings, in which:

FIG. 1 is a rear view, partly in cross section, of a rear axle assembly in accordance with the present invention;

FIG. 2 is a top view, partly in cross section, illustrating the rear axle assembly, in accordance with the present invention;

FIG. 3 is a bottom view, broken away, showing part of the rear axle assembly taken along lines 3—3 of FIG. 5;

Figure 4:
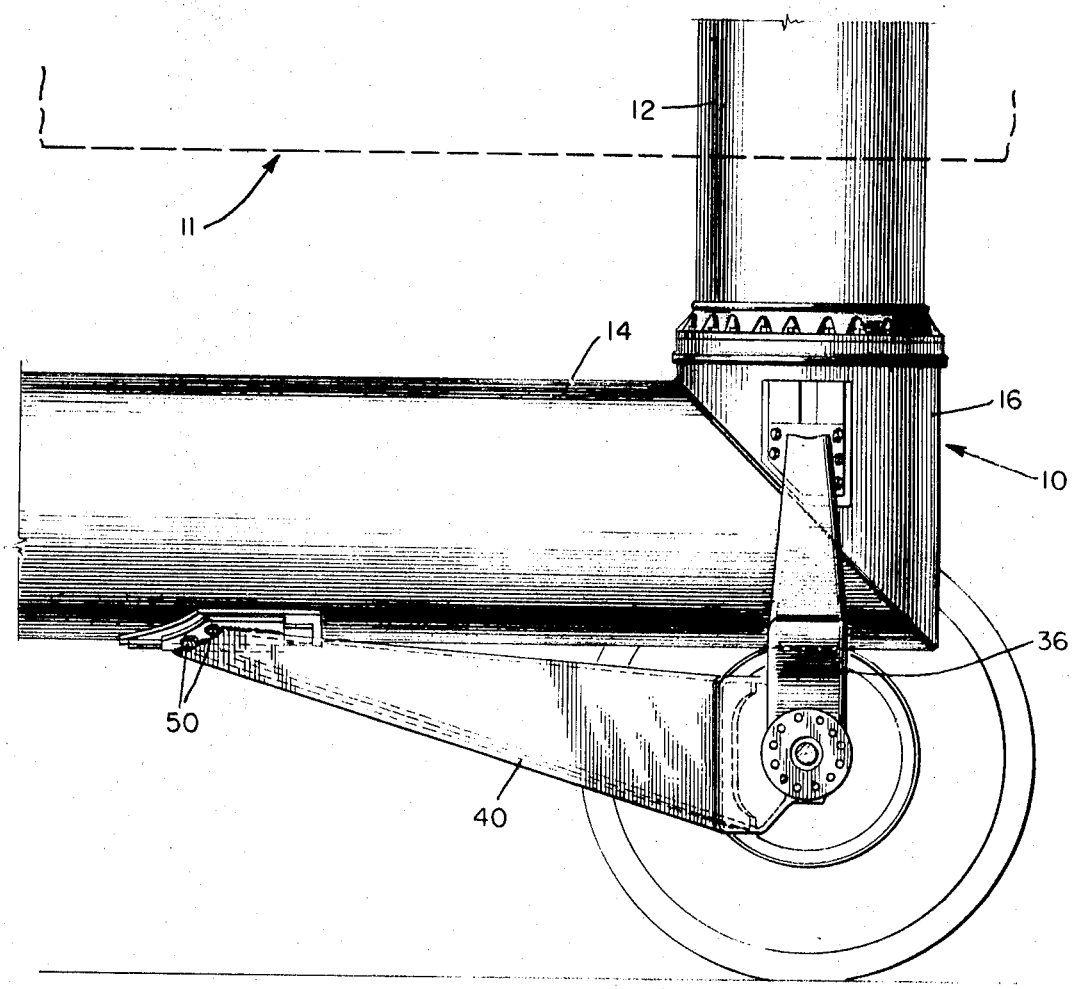
FIG. 4 is a side view with some parts omitted illustrating the rear axle assembly, in accordance with the present invention.
Figure 5:
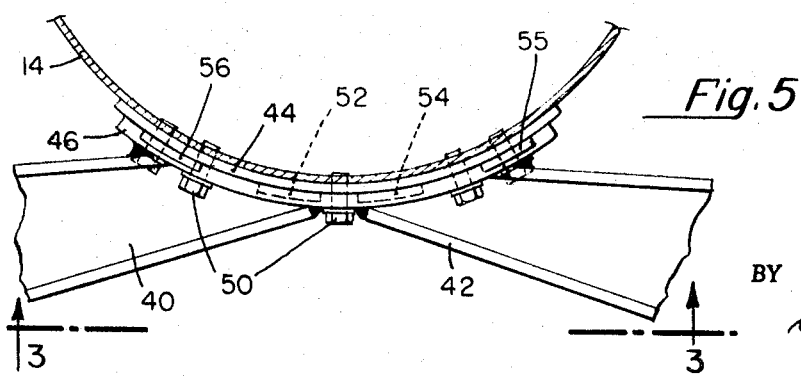

FIG. 5 is a view, partly in cross section, taken along lines 5—5 of FIG. 3 rotated 180°, and FIG. 6 is a cross sectional view showing a part of the axle assembly illustrated in a circle 6 of FIG. 1.

Referring to the drawings, a vehicle includes a chassis 13 including front and rear vertical post 12 and a main horizontal support beam 14. The front post is not illustrated. The chassis includes a connecting member 16 connecting the vertical posts to the horizontal beam to form the chassis for the vehicle.

A pod 11 is adapted to be moved up and down on the vertical post 12. The main supporting horizontal beam 14 extends from the rear to the front of the vehicle. The member 16 is welded on to the horizontal support member 14.

The horizontal support member 14 is supported on the main axle assembly 18 through a connecting support member 20. The rear axle assembly 18 is adapted to receive the driving elements for the vehicle and various other components including a pair of wheels 22 and 24 connected at the ends of the axle assembly.

The rear axle assembly 18 includes a center housing 26, a rear drive unit 28, a housing 30, and a pair of end fittings 32 and 34. The various parts of the axles are bolted together to permit easy assemble or disassembly. In a vehicle of the aforementioned type, the pod 10 may be as much as 15 feet wide. Consequently, means for easy disassembly of the axle assembly 18 facilitates the disassembly and shipment of the pod.

An upper strut assembly includes a pair of angular vertically extending strut members 36 and 38 connected from the end fittings 32 and 34, respectively, to the sides of the member 16 comprising part of the chassis of the vehicle.

A second pair of strut members include angle bars 40 and 42 which are connected from the end fittings 32 and 34, respectively, forwardly to the underside of the main support horizontal beam 14 comprising part of the main chassis. The strut members 40 and 42 and the upper strut members 36 and 38 are connected to the main supporting beam and the member 16 in a novel manner to permit accurate disassembly and reassembly after shipment, as will be described.

The upper strut assembly including the members 36 and 38 provide reinforcement when lateral forces resulting from high winds, for example, are exerted on the pod 10. This reinforcement is very important especially when the pod 10 is in an upper position.

The vertical angle members 40 and 42 provide reinforcement when the vehicle is braked. Braking loads have both torque and longitudinal forces exerted on the horizontal support beam.

In addition to providing a structure capable of handling lateral braking and turning forces, the rear axle assembly illustrated may be readily disassembled and reassembled with the main parts maintaining accurate alignment in the reassembled equipment. The arrangement for attaching the strut members 36 and 38 and the strut members 40 and 42 which permit accurate alignment of parts minimizing reassembly problems are illustrated in FIGS. 5 and 6.

The arrangement for attaching the members 40 and 42 to the bottom of the main horizontal beam 14 is illustrated in FIGS. 3 and 5. This arrangement is substantially the same as the one used for connecting the strut members 36 and 38 to the member 16.

Referring to FIGS. 3 and 5, a plate 44 is welded or otherwise suitably mounted to the underside of the horizontal beam 14 to form a permanent fixture. The plate 44 includes threaded areas and is adapted to receive a mounting plate 46 thereon. Screws 50 are used to attach the plate 46 to the fixed plate 44. The strut members 40 and 42 are then welded or otherwise suitably affixed to the plate 46.

Following the attachment of the plate 46, shear blocks 52, 54, 55 and 56 are fixedly mounted to the plate 44 with the plate 46 therebetween. After assembly of the angle members 40 and 42 to the plate 46, the ends of the members 40 and 42 are free resting within the openings of the end fittings 32 and 34.

While the members 40 and 42 are bolted to the horizontal member 14, they are then welded in place within the end fittings 32 and 34.

The ends of the members 40 and 42 overlap and fit into the end members 32 and 34. Some tolerances are provided to permit relative movement between the associated parts. After the members 40 and 42 are mounted in place their free ends are welded to the end members 32 and 34.

The mounting arrangement for strut members 36 and 38 including the plates and shear blocks are substantially the same as that described in connection with the strut members 40 and 42 and hence will not be redescribed. In the case of the strut members 40 and 42 a mounting plate for each member is provided and attached to either side of the member 16.

The means for welding the free ends of the members 36 and 38 is illustrated in FIG. 6. This is substantially the same arrangement use for welding the free ends of the members 40 and 42 to the end members 32 and 34 previously described.

Referring particularly to FIG. 6, a portion 60 of the member 36 is undercut and overlaps a cutaway portion 62 of the end member 32. Prior to welding, the parts are free to move relative to each other. After the members 32 and 36 have been fixed to the member 36, their free ends are welded to the end members 32 and 34, as by weld material 64.

The shear blocks are disposed in intimate contact with the plates on which the strut members are mounted. During movement of the vehicle the shear blocks 52, 54, 56 and 58 help maintain the plate 46 in place.

When the various parts of the vehicle are disassembled for shipment, for example, the plate 46 is detached from the plate 44. The shear blocks 52, 54, 56 and 58, however, are maintained in the same position on the plate 44. Consequently, when the parts are reassembled, the plate 46 fits precisely between the shear blocks in the same position which it occupied prior to disassembly. This arrangement makes for an extremely accurate alignment of the parts when they are reassembled.

The similar arrangement involving shear blocks exist with respect to the strut members 36 and 38.

Thus it is seen that the present invention has provided a novel rear axle assembly arrangement which is capable of handling external forces exerted on a vehicle from different directions as a result of high wind, turning, braking or the like. Further, the invention has provided an arrangement wherein the rear axle assembly may be disconnected from the chassis, which acts as a fixture, and reassembled in accurate alignment.

What is claimed is:

1. In combination with a vehicle including a chassis having a vertical post with a pod adapted to be moved up and down and a main horizontal support member, plates including blocks thereon secured to the bottom and sides of said chassis, a rear axle assembly for said vehicle comprising a rear axle member extending below said horizontal support member and transverse thereto, a first pair of strut members connected from points adjacent the ends of said rear axle member to forward points on the bottom of said chassis, the ends of said strut members being detachably mounted to said chassis, alignment elements fixedly mounted to said chassis to permit said strut members to be disassembled and reassembled in correct alignment with said blocks fixedly secured to said plates, a second pair of strut members connected from points adjacent said rear axle member and extending angularly upwardly to points on the sides of said chassis.

2. The invention as set forth in claim 1 wherein said rear axle member comprises a plurality of detachable elements.